(12) United States Patent
Nie et al.

(10) Patent No.: US 8,498,975 B2
(45) Date of Patent: Jul. 30, 2013

(54) SEARCH QUERY PROCESSING

(75) Inventors: Xuping Nie, Hangzhou (CN); He Xiao, Hangzhou (CN); Wei He, Hangzhou (CN); Jinghui Zhong, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 5 days.

(21) Appl. No.: 13/014,409

(22) Filed: Jan. 26, 2011

(65) Prior Publication Data
US 2011/0191319 A1   Aug. 4, 2011

(30) Foreign Application Priority Data
Feb. 1, 2010   (CN) .......................... 2010 1 0103540

(51) Int. Cl.
*G06F 17/30*   (2006.01)
(52) U.S. Cl.
USPC ............................ 707/706; 707/707; 707/708
(58) Field of Classification Search
USPC ................................................ 707/705–708
See application file for complete search history.

(56) References Cited

U.S. PATENT DOCUMENTS

| | | | |
|---|---|---|---|
| 6,654,734 B1 | 11/2003 | Mani et al. | |
| 7,472,113 B1 * | 12/2008 | Watson et al. | 1/1 |
| 7,630,972 B2 | 12/2009 | Ott et al. | |
| 7,827,172 B2 | 11/2010 | Zaragoza | |
| 7,873,640 B2 * | 1/2011 | Chang et al. | 707/739 |
| 8,065,283 B2 * | 11/2011 | De et al. | 707/705 |
| 2003/0063113 A1 * | 4/2003 | Andrae | 345/700 |
| 2003/0200198 A1 | 10/2003 | Chandrasekar et al. | |
| 2006/0230035 A1 | 10/2006 | Bailey et al. | |
| 2008/0147637 A1 | 6/2008 | Li et al. | |
| 2008/0250010 A1 | 10/2008 | Rathod et al. | |

FOREIGN PATENT DOCUMENTS
CN   101176058 A   5/2008

* cited by examiner

*Primary Examiner* — Monica Pyo
(74) *Attorney, Agent, or Firm* — Van Pelt, Yi & James LLP

(57) ABSTRACT

Providing search results is disclosed. A search query is received and a plurality of preprocessing functions to be performed on the search query is determined based at least in part on a search label corresponding to the search query. The plurality of preprocessing functions is performed on the search query to obtain a plurality of preprocessed search queries. Based at least in part on precision levels associated with the plurality of preprocessed search queries, a search plan comprising a selected preprocessed search query is generated. The search plan is input to the search engine to obtain the search results.

13 Claims, 5 Drawing Sheets

SEARCH QUERY PROCESSING

CROSS REFERENCE TO OTHER APPLICATIONS

This application claims priority to People's Republic of China Patent Application No. 201010103540.4 entitled METHOD AND DEVICE FOR SEARCH filed Feb. 1, 2010 which is incorporated herein by reference for all purposes.

FIELD OF THE INVENTION

The present application relates to the field of computing technology and specifically relates to network based searches.

BACKGROUND OF THE INVENTION

Search technology provides convenient measures for network users to rapidly find information on the Internet. There are primarily three categories of traditional search engines, i.e., robot search engines (Robot), catalog-style search engines (Directory or Catalog), and element search engines (Meta). Traditional search techniques mainly employ keyword matching to conduct the searches. It is often difficult for users to simply use keywords or keyword strings to faithfully express the content that should be searched. Natural language changes over time, region, or field, and the same concept can be expressed using different forms of language expressions; so in searching for the same concept, different users may use different keyword inquiries, resulting in large amounts of unrelated information to be returned to the users.

Some intelligent search engines employ semantic analysis technologies based on knowledge bases, utilizing word segmentation technology, phrase identification, processing synonyms, and other measures to do analysis by targeting user-input search parameters and generate different search schemes (also referred to as search plans). Among them, user input search parameters could be glossaries having specific characteristics, which can be translated words or homonyms. If the user inputs incorrect spelling of search terms, for example if the user mistakenly inputs "Beiking" as "Beijing", the system platform performs analysis of the erroneous word and automatically recommends a program that utilizes "Beijing" to conduct the search. Moreover, when users enter a search with natural language such as "I want to purchase a cell phone", what is actually searched for is "cell phone" and thus the search engine can simply retain "cell phone" as the search keywords. The two types of programs described above can be implemented separately in a search engine as a spellcheck module and an overwrite module. Among them, the spellcheck module is configured to change the erroneous input word into the correct input word; the overwrite module is configured to segment the input word, locate the keywords, etc., and rewrite the search terms with ones more suitable for search applications.

In existing technology, a dynamic loading module is usually employed to generate search plans. Specifically, in existing open-source service platforms like Apache servers, C code can be written to produce dynamic expansion modules. The Apache server is a web server that responds to HTTP (Hyper Text Transfer Protocol) requests and is used to respond to the most basic web services. When there is a dynamic loading module in the Apache server, the operating mechanisms of the Apache server must be fully understood or a PHP (Hypertext Preprocessor) module must be written, with the PHP module being configured to carry out repackaging of the Apache interface. The PHP module is dynamically loaded after compilation into the Apache server to provide the services. The aforementioned dynamic loading module employs a common chain of responsibility pattern design, and once the module's task is completed, then it immediately is unloaded from the application.

While the technique is useful for expanding the capabilities of existing server platforms, a number of issues remain. Because the design of the Apache server itself is complex, implementing Apache dynamic modules will directly result in higher cost and greater difficulty in maintenance. Moreover, there is no easy way to coordinate the work among the modules or exercise unified control of the writing of the modules. When new modules are added, previously written modules typically have to be updated to resolve any conflict. When the number of modules is large, the costs of upgrade will be substantial.

BRIEF SUMMARY OF THE INVENTION

A technique for processing a search query into preprocessed search queries, which are used to obtain search results that potentially reflect the user's intentions behind the search query. The technique includes: determining a plurality of preprocessing functions to be performed on the search query, based at least in part on a search label corresponding to the search query; performing the plurality of preprocessing functions on the search query to obtain a plurality of preprocessed search queries; generating, based at least in part on precision levels associated with the plurality of preprocessed search queries, a search plan comprising a selected preprocessed search query; and inputting the search plan to the search engine to obtain the search results.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Search query processing is disclosed. In some embodiments, a plurality of preprocessing functions is determined based on a search label that corresponds to a received search query. The preprocessing functions are performed on the search query to obtain a plurality of preprocessed results. A search plan comprising a selected preprocessed result is generated. In some embodiments, generating the search plan is based at least in part on precision levels associated with the plurality of preprocessed results. In some embodiments, generating the search plan is also based at least in part on confidence levels associated with the preprocessed results. The search plan is applied to a search engine, which conducts the search and generates the search results.

Figure 1:
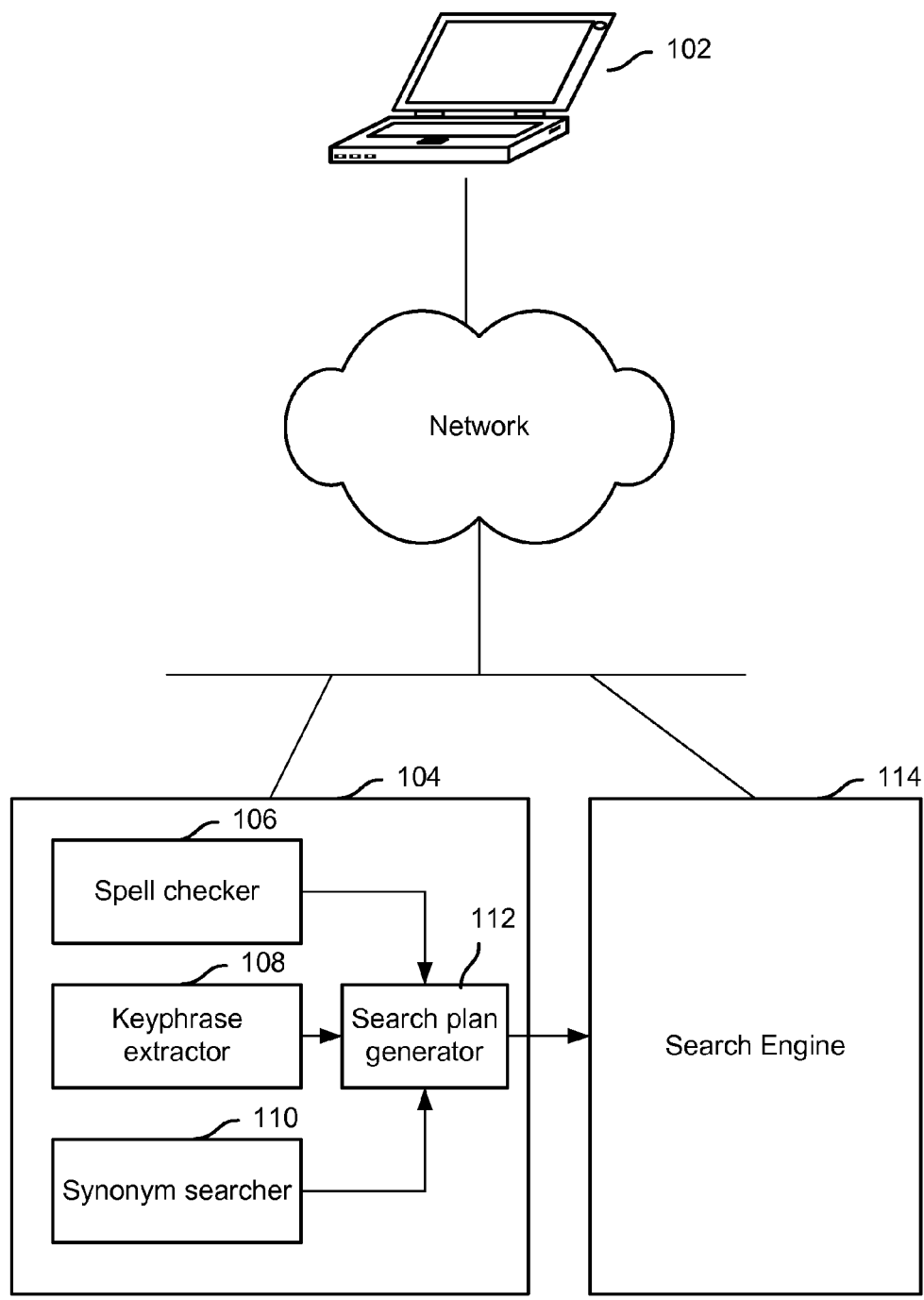
FIG. 1 is a block diagram illustrating an embodiment of a search system.

FIG. 1 is a block diagram illustrating an embodiment of a search system. In this example, a user inputs a search query in a client terminal 102, which sends the search query to a search system via a network such as the Internet. In some embodiments, the search system is a part of an electronic commerce platform and is configured to perform searches on products available on the e-commerce platform. The search system includes a preprocessing server 104, which includes a number of preprocessing modules to perform various preprocessing functions on the search term. Examples of the preprocessing modules include a spell checker 106 for correct the spelling of the input, a keyword extractor 108 for extracting the keyword or phrase from a lengthy search query, and a synonym searcher 110 for locating synonyms associated with the search query. Different/additional preprocessing modules performing other preprocessing functions may be included in other embodiments. The preprocessing modules perform preprocessing on the received search query to generate a plurality of preprocessed search queries. A search plan generator 112 generates a search plan, based at least in part on historical search data such as search terms and their associated precision level measures. Details of the search plan generate are described more fully below. The search plan is executed to obtain an input to a search engine 114 via a network. The input is sent to the search engine to obtain search results.

The functional modules (such as the spell checker, the keyword extractor, the synonym searcher, and the search plan generator) described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules. In some embodiments, the servers are Linux based platforms and the modules are implemented in C++.

Although preprocessing server 104 and search engine 112 are shown as separate devices with separate functions in this example, in some embodiments, they may be merged into a single device or further divided into additional devices.

Figure 2:
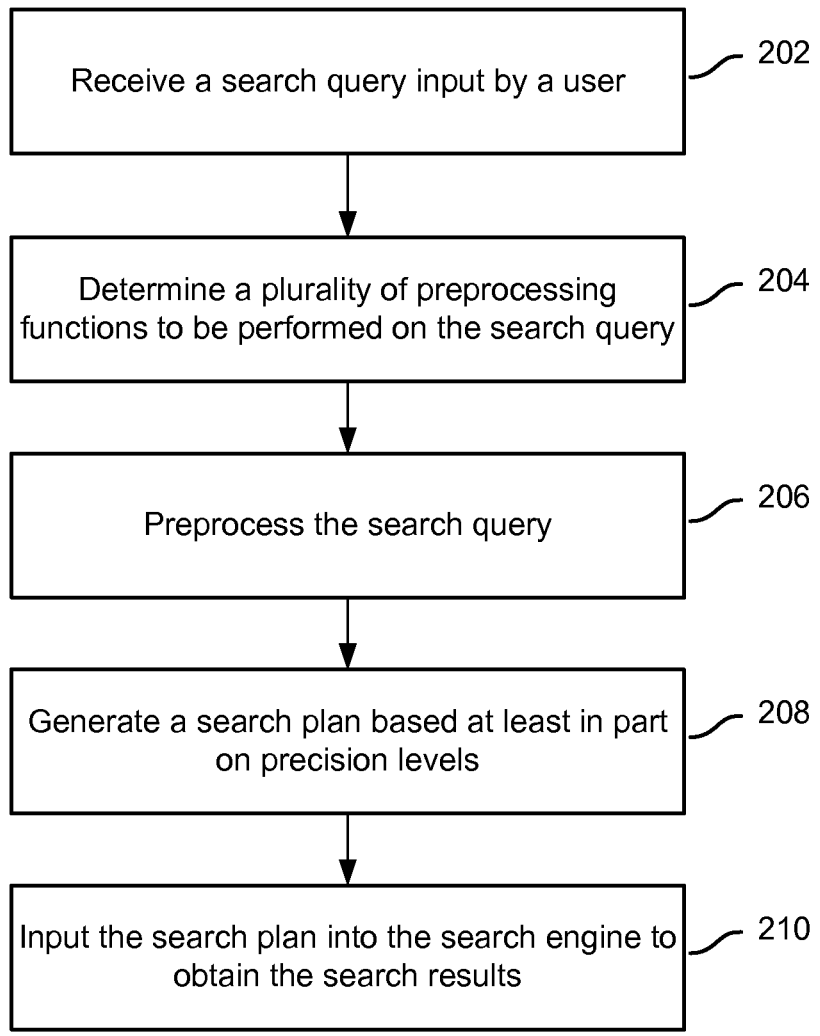
FIG. 2 is a flowchart illustrating an embodiment of a process for performing search on a plurality of modules.

FIG. 2 is a flowchart illustrating an embodiment of a process for performing search on a plurality of modules. Process 200 may be performed on a system such as 100 of FIG. 1.

At 202, a search query input by a user and sent via a client terminal is received.

At 204, a plurality of preprocessing functions to be performed on the search query are determined, based on at least in part on a search label that corresponds to the search query. The search label specifies the category of the search results to be returned in response to the search query. For example, "product", "information", "technology", and "all" are some search labels used to identify certain categories of search results. The search label may be preconfigured by the search system, selected by the user, or selected by the client terminal based on user inputs and/or requirements. In the event that the user or the client terminal does not provide a search label, the system can utilize a default, preconfigured search label such as the "all" search label.

In some embodiments, the search system maintains a mapping of different search labels, their corresponding preprocessing functions, and optionally the sequence in which the corresponding preprocessing functions are to be performed. Using the system described in FIG. 1 as an example, an "information" search label may correspond to the spell checker preprocessing function followed by the synonym preprocessing function; a "product" search label may correspond to the spell checker function followed by the keyword processing function. In some cases, a default preprocessing function execution sequence is configured for all of the execution modules. Based on user requirements or system configuration, one or more search labels that correspond to the search processing functions are selected. The search system uses the search label to determine the corresponding preprocessing functions and optionally their execution sequence for preprocessing the received search parameters.

At 206, the preprocessing function modules preprocess the search query. For example, a spellchecker will correct spelling of the search input (e.g., change spelling of "Beiking" to "Beijing"), a keyword extractor will extract keywords from a lengthy search query (e.g., change "I want to find a hotel in Beiking" to "hotel in Beijing"), a synonym searcher will find commonly used synonym for the search term (e.g., change "mobile" to "cell phone"), etc.

At 208, a search plan is generated based at least in part on the precision levels of the preprocessed queries, and optionally on the confidence levels of the preprocessed queries. The search plan includes a preprocessed search query that is selected from the plurality of preprocessed queries.

In some embodiments, the search platform tracks various user behaviors in response to the results from the queries. For example, the search platform can track the number of results returned, the rate at which certain query results elicit user selection (click through rate) and/or purchasing decision (purchase rate) to form a database of historical data. The precision level of a preprocessed query is determined based on historical data. For example, a score based on the historical click through rate and/or purchase rate can be computed for a particular preprocessed query term and stored as the corresponding precision level for the term. Thus, a query term has an associated precision level such as a precision score, which can be obtained by looking up the query term in a database.

In some embodiments, generating the search plan includes determining whether the levels of precision of the preprocessed search terms meet a precision requirement such as a minimum score based on historical data. The preprocessed search terms that do not meet the precision requirement are excluded from the search plan.

In some embodiments, it is additionally determined whether there are conflicts among the preprocessed queries that meet the minimum precision requirements. A conflict is detected when two or more preprocessed queries meet the minimum precision requirement. If there are conflicts, then the preprocessed query with the maximum level of precision is selected.

If no historical data is available for the preprocessed queries, the confidence levels associated with these preprocessed queries are compared. The confidence level measures how confident the preprocessed query accurately reflects the user's intentions. For example, when a query of "I want to buy a mobile phone" is entered, the keyword extractor generates a preprocessed query of "mobile phone" and a confidence level of 90% indicating that it is 90% likely that the item the user is searching for is mobile phone. As another example, if the original query is "I want to buy a mobil phone", the spellchecker may generate a preprocessed query of "I want to buy a mobile phone" with 99% confidence.

The preprocessing modules have the same interface (such as programming interface) such that the results can be easily compared. For example, the outputs of all the preprocessing modules in a system can be set to include a query and a confidence level. The uniform interface allows modules to be added to the search platform flexibly.

In some embodiments, the preprocessed queries may be compared with additional requirements such as a second precision requirement to select the preprocessed query that will likely yield the best search result.

At 210, the search plan is input into the search engine to obtain the search results, which are sent to the client terminal.

In some embodiments, the preprocessed results are sent to the client terminals, provided for the use of the client terminals. For example, when a preprocessing module filters for forbidden words, the preprocessed results can be returned directly to the client terminals without performing any further search.

By using multiple preprocessing modules to preprocess the query term and selecting the preprocessed query that has the highest precision and/or confidence level, the search system better determines the user's intentions and tends to find more appropriate search results. By offloading the preprocessing functions to a preprocessing server, the resources of the search engine are conserved and the stability of the search engine is better preserved.

Figure 3:
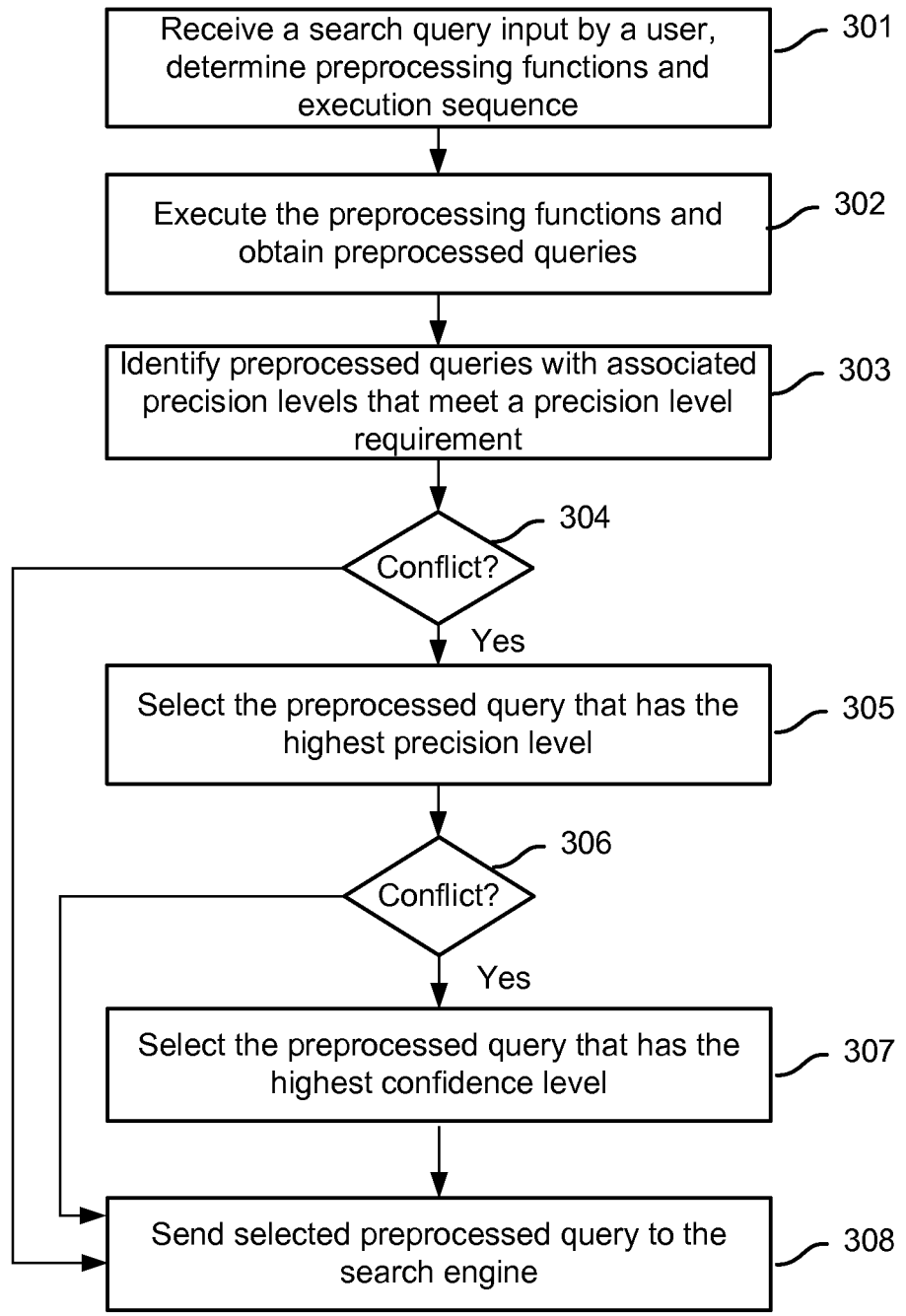
FIG. 3 is a flowchart illustrating another embodiment of a process for providing search results.

FIG. 3 is a flowchart illustrating another embodiment of a process for providing search results.

At 301, the preprocessing server receives a search query input by a user via a client terminal, and determines a plurality of preprocessing functions and their execution sequence for preprocessing the search query based on search labels that are preconfigured or selected by the client terminals. For example, a user may input "I want to buy a mobil phone" as a search query.

At 302, the preprocessing server executes in sequence the preprocessing functions according to the execution sequence and obtains preprocessed queries. For example, the preprocessed queries returned by a spellchecker, followed by a keyword extractor, followed by a synonym searcher are "I want to buy a mobile phone", "mobile phone", and "cell phone", respectively.

At 303, the preprocessing server identifies preprocessed queries with associated precision levels that meet a precision level requirement.

At 304, the preprocessing server determines whether there is any conflict among the preprocessed queries that meet the first precision requirements. For example, if "cell phone" is the only preprocessed query that meets the precision level requirement, then no conflict exists. If, however, both "mobile phone" and "cell phone" meet the precision level requirement, there is a conflict.

If there is a conflict among the preprocessed queries that meet the first precision requirements, then step 305 is executed; otherwise, step 308 is executed.

At 305, the preprocessing server selects the preprocessed query (queries) that has (have) the highest level of precision. For example, if "cell phone" and "mobile phone" both have the same precision level that is higher than "I want to buy a mobile phone", then both "cell phone" and "mobile phone" are selected.

At 306, the preprocessing server determines whether there is still conflict in the selected query (queries). A conflict is found when multiple preprocessed queries are selected.

If there is a conflict, then step 307 is executed; otherwise, step 308 is executed.

At 307, the preprocessed query that has the highest confidence level is selected.

At 308, the preprocessing server sends the preprocessed query with the highest precision/confidence level to the search engine and returns the execution results to the client terminal.

In some embodiments, a unified interface is set up for each of the preprocessing modules in the execution sequence, and a unified level of precision for the execution results of each of the execution modules is set up via the interface. When the number of preprocessed queries that are retained in the search plan is greater than a predefined number of individual outputs, the preprocessed queries are ranked according to their respective precision levels and the highest ranked preprocessed query/queries are selected to be included in the search plan.

In some implementations, there are a multitude of possibilities present in the outputs of the preprocessed queries, thus there is a precise degree of matching of the input keywords and other conditions. If the input keywords strictly match the words in the modules, then the precision of the output of those modules is high. Because the lexicographic indexes of each of the preprocessing functions are independent, there is no correlation in the precision of the outputs of different preprocessing functions. Because each of the preprocessing functions are mutually independent, when new preprocessing function modules are added, it is not necessary to change the previous modules, and a unified interface can be set up for the module outputs, used to carry out configuration of the modules for the precision of the outputs. Although the modules carry out different processing and produce different results, the outputs are associated with normalized levels of precision so that comparison and selection can be easily made.

The present application comprises the following advantages, coordination is carried out based on the precision of the execution results of execution modules for the execution modules that could be in conflict, and is able to more quickly and accurately acquire the user's intentions behind the search parameters and convert the user's intentions into machine language and execution strategies that the search engine is capable of understanding, facilitating management of the execution modules, under the prerequisite of not changing the original execution modules, is capable of outputting better search words. Moreover, independent services are employed for executing the preprocessing functions, which does not affect the stability of the search engine's core query services, and distributed deployment of the execution modules can be carried out, which does not bind them to the search engine services, nor does it compete with the search engine for server resources, generating little pressure on the server, with fast processing speeds. Of course, any product that implements the present application does not definitely have to attain all of the aforementioned advantages simultaneously.

The above-described embodiments of the present application have provided methods for searching and application circumstances, and correspondingly, the present application also provides means for applying the aforementioned methods via the following embodiments.

Figure 4:
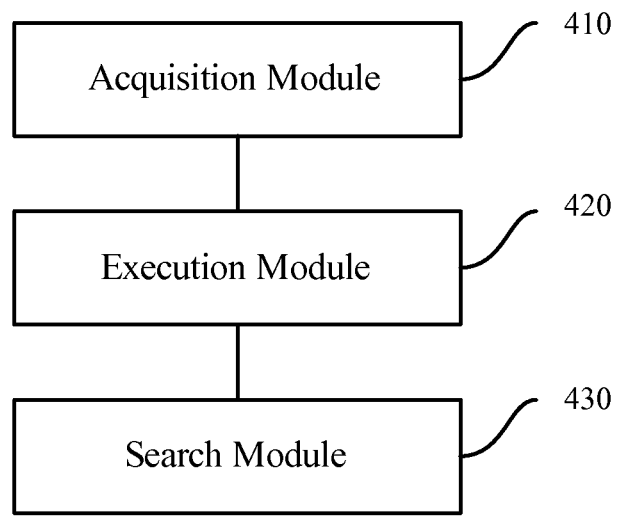
FIG. 4 is a block diagram illustrating an embodiment of a preprocessing server.

FIG. 4 is a block diagram illustrating an embodiment of a preprocessing server. The preprocessing server includes: acquisition module 410, used to acquire the search queries input by client terminals and to determine the execution sequence for processing of the search query based on search labels that are preconfigured or selected by the client terminals; execution module 420, used to execute the preprocessing functions in sequence corresponding to the execution sequence, acquire the preprocessed queries, and generate search plans based on the levels of precision of the preprocessed queries; search module 430, used to carry out the search according to the search plan and obtain the search results.

In such a system, coordination is carried out based on the precision of the execution results of execution modules for the execution modules that could be in conflict. The system is able to more quickly and accurately acquire the user's intentions behind the search parameters and convert the user's intentions into machine language and execution strategies such that the search engine is capable of understanding, facilitating management of the execution modules, under the prerequisite of not changing the original execution modules, is capable of outputting better search words.

Figure 5:
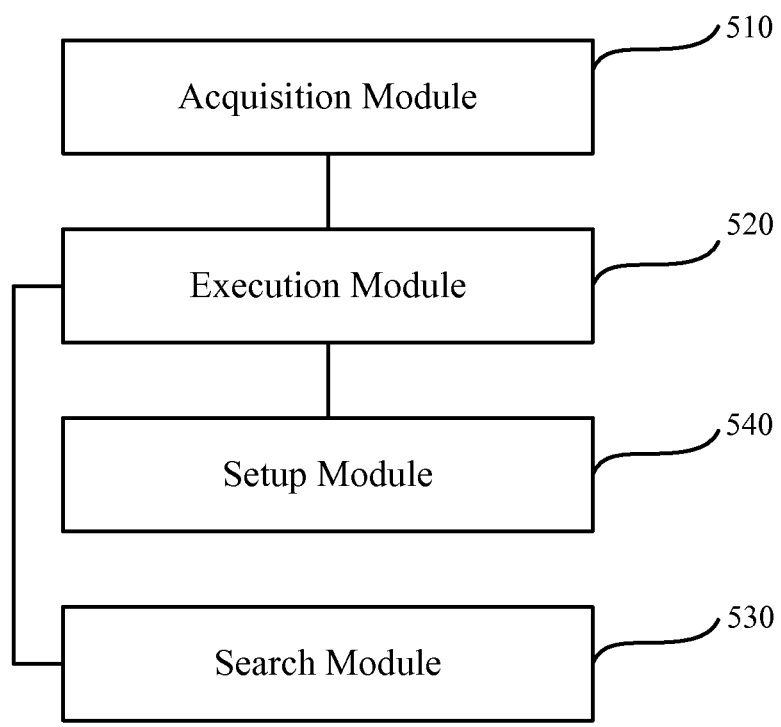
FIG. 5 is a block diagram illustrating another embodiment of a preprocessing server.

FIG. 5 is a block diagram illustrating another embodiment of a preprocessing server. The preprocessing server includes acquisition module 510, used to acquire the query input by client terminals and to determine the execution sequence for processing of the query input based on search labels that are preconfigured or selected by the client terminals.

The preprocessing server further includes execution module 520, used to execute the preprocessing functions, acquire the preprocessed queries, and generate search plans based on the level of precision of the preprocessed queries. The execution module is specifically used to determine whether the levels of precision of the preprocessed queries meet the first precision requirements. The execution module is also used to determine whether there is any conflict among the preprocessed query results that meet the first precision requirements, and if there is conflict, then the preprocessed query with the highest levels of precision is selected.

Execution module 520 is specifically used to determine whether two or more preprocessed queries meet the first precision requirements. If so, it is determined that there is conflict among the preprocessed queries that meet the first precision requirements; otherwise, it is determined that there are no mutual conflicts among said execution modules that meet the first precision requirements.

In some embodiments, the execution module 520 is also used for notifying subsequent preprocessing function modules in the execution sequence, causing the subsequent preprocessing function modules to generate preprocessed queries based on the existing preprocessed queries.

The server further includes search module 530, used to determine the search query based on the search plan generated by the execution module, carry out the search in accordance with the preprocessed query, and acquire the search results.

The output results of said preprocessing function modules also comprise the execution results of said preprocessing function modules, the above-described search module 530 also being used when the output results of said preprocessing function modules meet the second precision requirements and said search parameters meet the preset complexity requirements to carry out searches in accordance with the execution results of said preprocessing function modules, acquiring the search results.

The server further includes a setup module 540, used to set up unified interfaces for each of the preprocessing function modules in said execution sequence, setting up unified levels of precision for the output results of each of said preprocessing function modules via said interfaces, provided for use by said execution module 520.

Technical personnel in this field can understand that distribution of the modules in the means in the embodiments can be carried out in the means of the embodiments in accordance with the descriptions of the embodiments, and that the corresponding changes can be carried out located in one or a plurality of means no different from the present embodiment. The modules of the above-described embodiments can be concentrated together, and can be deployed separately; they can be merged as one module, and can as well be further disassembled and divided into a plurality of submodules. The serial numbers of the embodiments of the present application are merely for the purposes of description and do not represent the advantages or shortcomings of the embodiments.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing search results, comprising:
receiving a search query;
determining, using a processor, a plurality of preprocessing functions to be performed on the search query, based at least in part on a search label corresponding to the search query, wherein the search label is associated with a mapping to the plurality of preprocessing functions and a mapping to an execution sequence of the plurality of preprocessing functions, wherein the execution sequence describes an order in which at least some of the plurality of preprocessing functions are to be performed;
performing the plurality of preprocessing functions on the search query based at least in part on the execution sequence to obtain a plurality of preprocessed search queries;
generating, based at least in part on precision levels associated with the plurality of preprocessed search queries, a search plan, wherein generating the search plan includes selecting, from the plurality of preprocessed search queries, a preprocessed search query that meets a precision requirement to include in the search plan and a preprocessed search query that does not meet the precision requirement to exclude from the search plan, wherein the precision requirement is determined based on historical data; and inputting the search plan to a search engine to obtain the search results.

2. The method of claim 1, wherein generating the search plan further includes determining whether there is a conflict among the preprocessed search queries that meet the precision requirement.

3. The method of claim 2, wherein determining whether there is a conflict among the preprocessed search queries that meet the precision requirement includes determining whether two or more preprocessed search queries meet the precision requirement.

4. The method of claim 2, in the event that there is a conflict, selecting a preprocessed search query that has the highest precision level.

5. The method of claim 2, in the event that there is a conflict, generating the search plan further comprising determining that the multiple preprocessed search queries meet a confidence level requirement.

6. The method of claim 1, wherein the plurality of preprocessing functions have a unified interface.

7. A system for providing search results, comprising:
one or more processors configured to:
receive a search query;
determine a plurality of preprocessing functions to be performed on the search query, based at least in part on a search label corresponding to the search query, wherein the search label is associated with a mapping to the plurality of preprocessing functions and a mapping to an execution sequence of the plurality of preprocessing functions, wherein the execution sequence describes an order in which at least some of the plurality of preprocessing functions are to be performed;
perform the plurality of preprocessing functions on the search query based on the execution sequence to obtain a plurality of preprocessed search queries;
generate, based at least in part on precision levels associated with the plurality of preprocessed search queries, a search plan, wherein generating the search plan includes selecting, from the plurality of preprocessed search queries, a preprocessed search query that meets a precision requirement to include in the search plan and a preprocessed search query that does not meet the precision requirement to exclude from the search plan, wherein the precision requirement is determined based on historical data; and
input the search plan to a search engine to obtain the search results; and one or more memories coupled to the one or more processors, configured to provide the one or more processors with instructions.

8. The system of claim 7, wherein generating the search plan further includes determining whether there is a conflict among the preprocessed search queries that meet the precision requirement.

9. The system of claim 8, wherein determining whether there is a conflict among the preprocessed search queries that meet the precision requirement includes determining whether two or more preprocessed search queries meet the precision requirement.

10. The system of claim 8, in the event that there is a conflict, selecting a preprocessed search query that has the highest precision level.

11. The system of claim 8, in the event that there is a conflict, generating the search plan further comprising determining that the multiple preprocessed search queries meet a confidence level requirement.

12. The system of claim 8, wherein the plurality of preprocessing functions have a unified interface.

13. A non-transitory computer readable storage medium having a computer program product for providing search results and comprising computer instructions for:
receiving a search query;
determining a plurality of preprocessing functions to be performed on the search query, based at least in part on a search label corresponding to the search query, wherein the search label is associated with a mapping to the plurality of preprocessing functions and a mapping to an execution sequence of the plurality of preprocessing functions, wherein the execution sequence describes an order in which at least some of the plurality of preprocessing functions are to be performed;
performing the plurality of preprocessing functions on the search query based on the execution sequence to obtain a plurality of preprocessed search queries;
generating, based at least in part on precision levels associated with the plurality of preprocessed search queries, a search plan, wherein generating the search plan includes selecting, from the plurality of preprocessed search queries, a preprocessed search query that meets a precision requirement to include in the search plan and a preprocessed search query that does not meet the precision requirement to exclude from the search plan, wherein the precision requirement is determined based on historical data; and
inputting the search plan to a search engine to obtain the search results.

* * * * *